(12) United States Patent
Ruatta et al.

(10) Patent No.: US 7,569,174 B2
(45) Date of Patent: Aug. 4, 2009

(54) CONTROLLED DENSIFICATION OF FUSIBLE POWDERS IN LASER SINTERING

(75) Inventors: Stephen A. Ruatta, South Pasadena, CA (US); Khalil M. Moussa, Stevenson Ranch, CA (US)

(73) Assignee: 3D Systems, Inc., Rock Hill, SC (US)

( * ) Notice: Subject to any disclaimer, the term of this patent is extended or adjusted under 35 U.S.C. 154(b) by 778 days.

(21) Appl. No.: 11/005,785

(22) Filed: Dec. 7, 2004

(65) Prior Publication Data

US 2006/0119012 A1    Jun. 8, 2006

(51) Int. Cl.
*B29C 35/08*    (2006.01)
*B29C 41/02*    (2006.01)

(52) U.S. Cl. ..................................... 264/497
(58) Field of Classification Search .............. 264/113, 264/497
See application file for complete search history.

(56) References Cited

U.S. PATENT DOCUMENTS

| | | | |
|---|---|---|---|
| 4,247,508 A | 1/1981 | Housholder | 264/219 |
| 4,863,538 A | 9/1989 | Deckard | 156/62.2 |
| 4,944,817 A | 7/1990 | Bourell et al. | 156/62.2 |
| 5,132,143 A | 7/1992 | Deckard | |
| 5,352,405 A | 10/1994 | Beaman et al. | 419/45 |
| 5,530,221 A | 6/1996 | Benda et al. | |
| 5,648,450 A | 7/1997 | Dickens et al. | 528/323 |
| 5,932,059 A | 8/1999 | Langer et al. | |
| 5,990,268 A | 11/1999 | Dickens et al. | 528/323 |
| 6,085,122 A | 7/2000 | Manning | 700/212 |
| 6,694,207 B2 | 2/2004 | Darrah et al. | 700/119 |
| 6,930,278 B1 | 8/2005 | Chung et al. | 219/121.85 |
| 2002/0015654 A1 | 2/2002 | Das et al. | 419/8 |
| 2004/0104499 A1 | 6/2004 | Keller | |
| 2004/0200816 A1 | 10/2004 | Chung et al. | |

FOREIGN PATENT DOCUMENTS

| | | |
|---|---|---|
| EP | 1 466 718 A2 | 10/2004 |
| FR | 2 828 423 A1 | 2/2003 |
| GB | 2 378 150 A | 2/2003 |
| GB | 2 395 927 A | 6/2004 |
| WO | WO 88/02677 A2 | 4/1988 |
| WO | WO 01/91924 A1 | 12/2001 |

OTHER PUBLICATIONS

French Examination Application No. FR 05 12351 dated Oct. 26, 2007-5 pages; no English translation for pp. 3-5.
Tontowi, Alva et al., Density Prediction of Crystalline Polymer Sintered Parts at Various Powder Bed Temparatures, Rapid Prototyping Journal, vol. 7-No. 3-2001 pp. 180-184.
Tontowi, Alva E. and Childs, T.H.C. "Density Prediction of Crystalline Polymer Sintered Parts at Various Powder Bed Temperatures," *Rapid Prototyping Journal*, vol. 7, No. 3, 2001 pp. 180-184.

*Primary Examiner*—Leo B Tentoni
(74) *Attorney, Agent, or Firm*—Ralph D'Alessandro; Keith A. Roberson

(57) ABSTRACT

The invention relates to a method producing parts using laser sintering wherein a fusible powder is exposed to a plurality of laser scans at controlled energy levels and for time periods to melt and densify the powder and in the substantial absence of particle bonding outside the fusion boundary. Strength is improved up to 100% compared to previous methods. An example includes a relatively high energy initial scan to melt the powder followed by lower energy scans controlled to densify the melt and separated in time to dissipate heat to the surrounding part cake. The rate and extent to which the powder particles are fused together can be controlled so that each successive scan can be used to fuse the particles together in discreet incremental steps. As a result, the final dimensions of the part and its density and mechanical properties can be improved compared to conventional methods and part growth avoided.

15 Claims, 6 Drawing Sheets

| Laser power | # scans 1 | 2 | 3 | 4 | 5 | 10 | 20 | | |
|---|---|---|---|---|---|---|---|---|---|
| 12 watts | | | | | | | | | |
| 10 watts | | 24.1 | | | | | | | |
| 8 watts | | 21.5 | 27.1 | | | | | | |
| 7 watts | 12.5 | 14.8 | 25 | 28.7 | | 43.2 | | 7 watts @ 10 scans is too hot(melted) | |
| 6 watts | 10.5 | 13.2 | 19.9 | 25.3 | 33.7 | 33.5 | | 6 watts @ > 5 scans is reproducible | |
| 5 watts | 7.5 | 11.2 | 12.3 | 12.5 | 12.7 | 31.3 | | 5 watts @ 10 scans is borderline | |
| 4 watts | | | | | | 10.2 | 13.9 | 4 watts @ 20 scans is not enough energy | |

13-Jun-03
10-Jun-03

Laser Power(watts) with multiple scans

– ♦ – 4 watts
– ■ – 5 watts
– △ – 6 watts
– ○ – 7 watts
– ✱ – 8 watts
– ● – 10 watts
+ 12 watts

FIG. 5

CONTROLLED DENSIFICATION OF FUSIBLE POWDERS IN LASER SINTERING

BACKGROUND OF THE INVENTION

The invention relates generally to a method of rapid prototyping and manufacturing and, more particularly, to laser sintering.

Rapid prototyping and manufacturing (RP&M) is the name given to a field of technologies that can be used to form three-dimensional objects rapidly and automatically from computer data representing the objects. In general, rapid prototyping and manufacturing techniques build three-dimensional objects, layer-by-layer, from a working medium utilizing sliced data sets representing cross-sections of the object to be formed. Typically an object representation is initially provided by a Computer Aided Design (CAD) system. RP&M techniques are sometimes referred to as solid imaging and include stereolithography, ink jet printing as applied to solid imaging. and laser sintering, to which the invention is directed.

Laser sintering apparatus dispenses a thin layer of fusible powder, often a fusible polymer powder or polymer coated metal, over a bed of the powder and then applies thermal energy to melt those portions of the powder layer corresponding to a cross-section of the article being built in that powder layer. Lasers typically supply the thermal energy through modulation and precise directional control to a targeted area of the powder layer. Conventional selective laser sintering systems, such as the Vanguard system available from 3D Systems, Inc., use carbon dioxide lasers and position the laser beam by way of galvanometer-driven mirrors that deflect the laser beam. The apparatus then dispenses an additional layer of powder onto the previously fused layer and repeats the process of melting and selective fusing of the powder in this next layer, with fused portions of later layers fusing to fused portions of previous layers as appropriate for the article, until the article is complete. These articles are sometimes referred to as "built parts."

A computer operates the control system for the laser, programmed with information indicative of the desired boundaries of a plurality of cross sections of the part to be produced. The laser may be scanned across the powder in raster fashion or vector fashion. In vector fashion, the laser beam traces the outline and interior of each cross-sectional region of the desired part. In a raster scan, a modulated laser beam scans a repetitive pattern across the powder. In some applications, cross-sections of articles are formed in a powder layer by fusing powder along the outline of the cross-section in vector fashion, either before or after a raster scan that "fills" the area within the vector-drawn outline.

Detailed descriptions of laser sintering technology may be found in U.S. Pat. Nos. 4,863,538; 5,132,143; and 4,944,817, all assigned to Board of Regents, The University of Texas System, and in U.S. Pat. No. 4,247,508 to Housholder.

Laser sintering technology enables the direct manufacture of three-dimensional articles of high resolution and dimensional accuracy from a variety of fusible materials, including polystyrene, some nylons, other plastics, and composite materials, including polymer coated metals and ceramics. Laser sintering may be used for the direct fabrication of molds from a CAD database representation of the object to be molded. Computer operations "invert" the CAD database representation of the object to be formed to directly form the negative molds from the powder.

Laser sintering depends upon thermal control of the process in the part cake to obtain good three-dimensional parts. The sources of thermal energy are the laser, cylinder heaters that preheat the powder in powder feed cylinders that supply a powder layer to the apparatus, radiant heaters to heat the powder prior to deposit on the laser target area, the radiant heater for the laser target area, and the laser. The laser is typically a $CO_2$ laser that scans the fresh powder layer to fuse the powder particles in the desired areas.

The increasing number of applications for laser sintered products has resulted in a demand for built parts having improved physical properties. Present commercial systems effectively deliver powder and thermal energy in a precise and efficient way. Nevertheless, laser sintered parts are sometimes dimensionally distorted and may not have the strength of, for example, injection molded plastic parts.

The sintering process may leave void spaces between the individual particles that reduce the strength of the built part. Increasing the thermal energy supplied to the fusible powders can result in dimensionally distorted parts. Heated particles at the boundaries of the target area may melt and adhere to particles immediately outside the targeted area. The interior of individual powder particles may become melted causing excess material to flow into void spaces that exist between the surrounding particles. One or more layers may experience an overall increase in dimensions from the nominal values calculated by the CAD program. The undesirable increase is commonly referred to as "growth" and reflects that the mean value of the dimensions obtained varies an unacceptable degree from the calculated nominal value. Such growth may make a sintered part unusable for its intended purpose.

Thus, there exists a need for a method of using laser sintering to produce parts that are accurate and have high strength.

BRIEF SUMMARY OF THE INVENTION

The invention provides an improved method of forming a three dimensional object using laser sintering and an apparatus for accomplishing the method. Each powder layer is scanned a plurality of times with a laser along the same fusion path without significant cooling between the scans so that the powder in the fusion path remains at or near the melting point without extending outside the fusion boundary and without fusing powder outside the part boundary. Density and tensile strength, tensile modulus, and elongation-to-break are all controlled more effectively and in the absence of significant growth comparable to injection molded parts. While not wishing to be bound by theory, it is believed that controlling the laser intensity or energy level and frequency of scanning according to the invention dissipates the heat of fusion into the surrounding part cake without causing the melted powder to extend beyond the desired fusion boundary and without resulting in fusion of the powder outside the fusion boundary.

Exposing each layer to multiple laser scans allows the rate at which the individual particles are fused to be controlled so that the molten material flows together in discreet incremental steps. Each successive scan provides that amount of energy needed to keep the powder at or near its melting point, and normally slightly above its melting point. The softened particles can then flow together filling void spaces in the fusion path to produce a solidified mass. Growth is avoided, accuracy is improved, and the density of the parts can be increased to that comparable with injection molding.

The power of each successive scan can be varied to reduce the time taken to apply multiple laser scans along the same laser path and to achieve the desired part density and dimensions. A relatively higher energy level initial scan should be sufficient to raise the powder to the region of its melting point and to melt the outer regions of the powder particles in the absence of excessive melting that could result in unwanted growth. Successive scans should be applied at a lower energy level sufficient to maintain the powder at or near and normally slightly above its melting point and at the desired low viscosity since less heat is required in the subsequent scans to maintain or increase the temperature of the powder and thereby reduce the viscosity of the melt. Successive scans can be at successively lower energy levels. As a result, the amount of time required for multiple scans along the same path can be reduced.

Thus, the invention provides a method whereby parts can be produced with laser sintering that have improved dimensional accuracy and mechanical properties by multiple laser scans along the same fusion path. The invention also includes a laser sintering apparatus that provides for multiple scans along the same fusion path at different laser beam intensities or energy levels.

BRIEF DESCRIPTION OF THE SEVERAL VIEWS OF THE DRAWINGS

Figure 1:
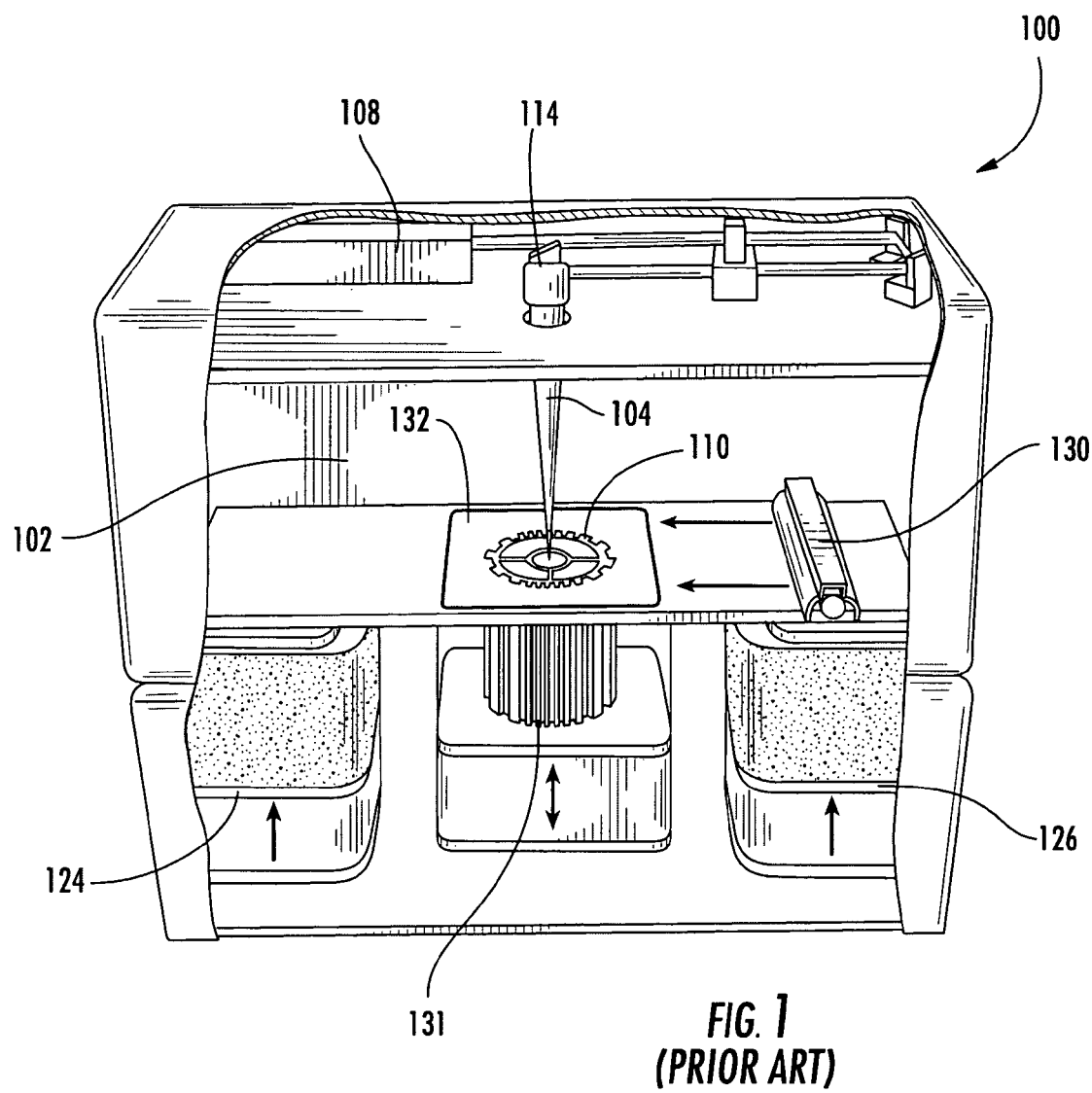
Figure 2:
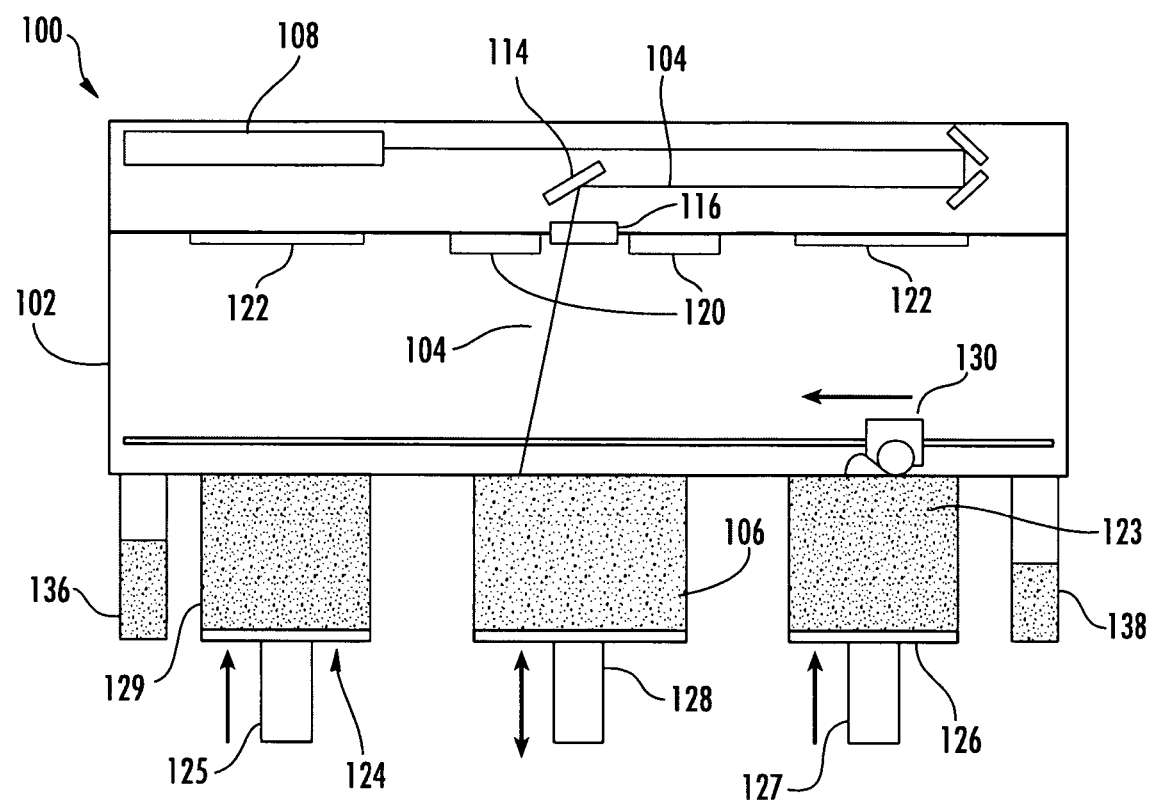
Figure 3A:
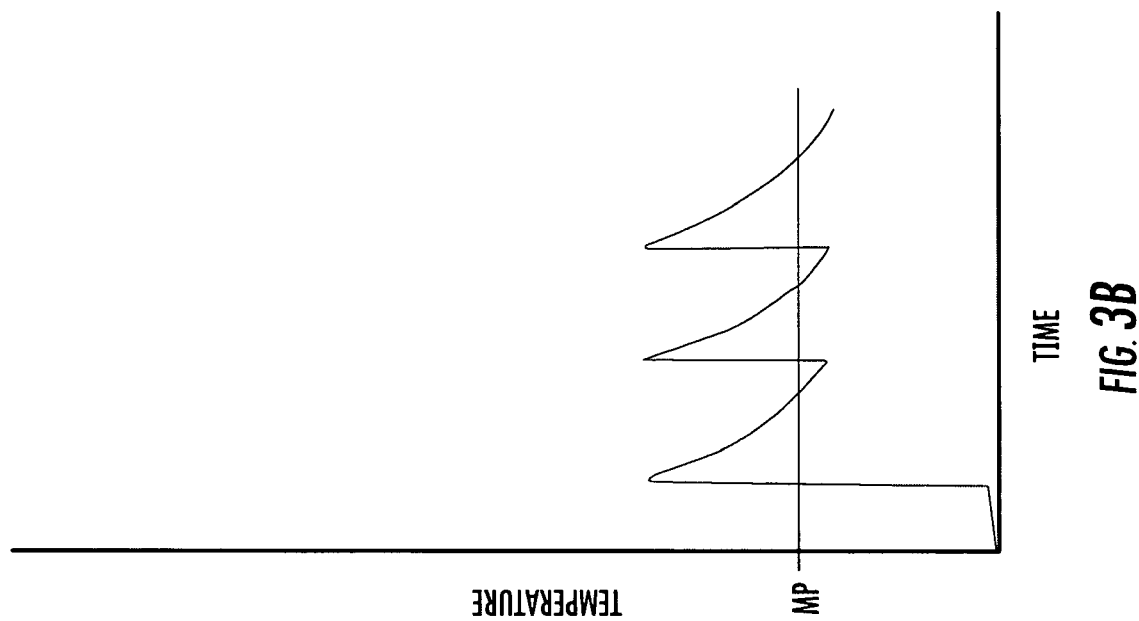
Figure 3B:
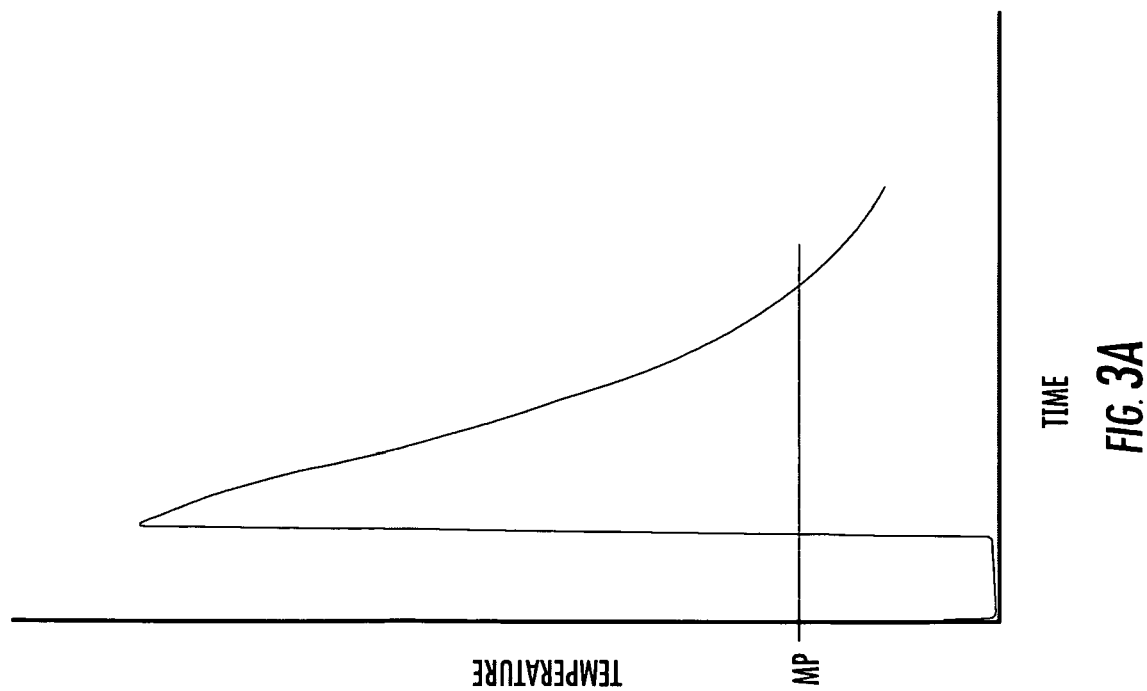
Figure 3C:
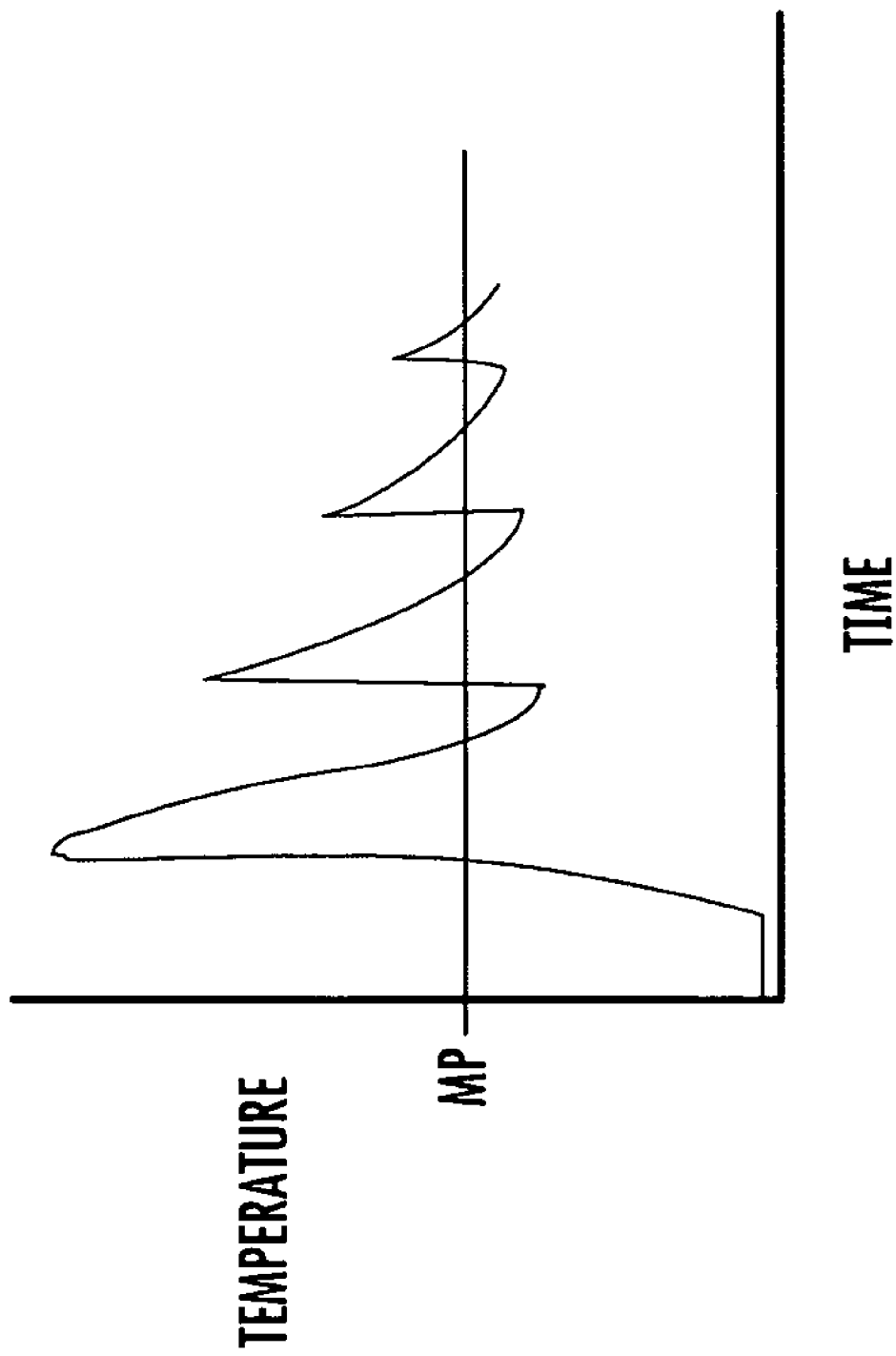
Figure 4:
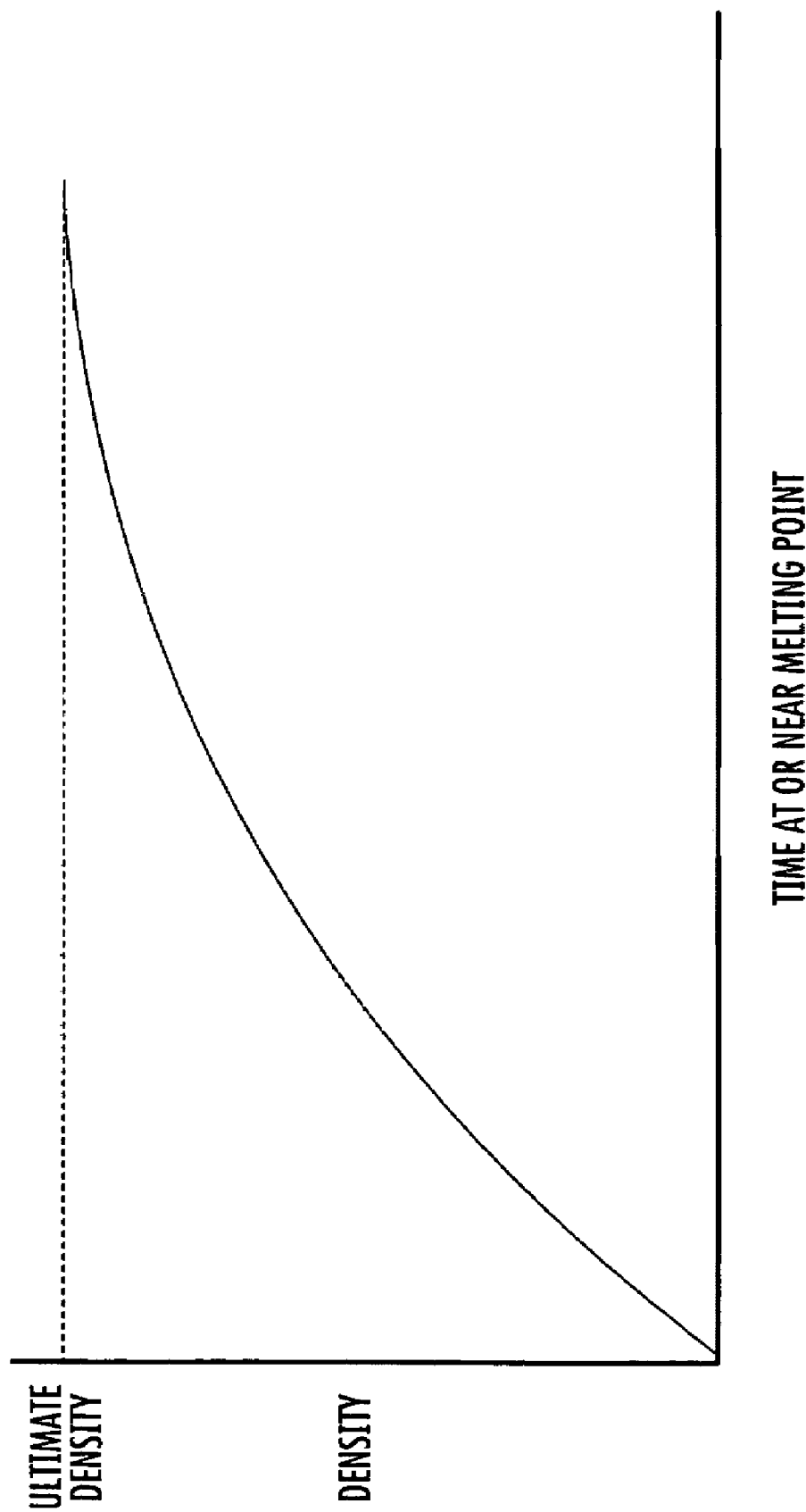

Having thus described the invention in general terms, reference will now be made to the accompanying drawings, which are not necessarily drawn to scale, and wherein:

FIG. 1 is a front perspective cutaway view of a conventional laser sintering system illustrating the internal structure of a laser sintering apparatus of the prior art;

FIG. 2 is a schematic illustration of the principal operating systems of the laser sintering apparatus of FIG. 1;

FIG. 3A is a graphical illustration depicting the amount of heat introduced during a typical high energy laser scan of the prior art to melt a fusible powder to form a three-dimensional object;

FIG. 3B is a graphical illustration of the amount of heat introduced in the practice of the invention by three successive laser scans at a reduced energy as compared to FIG. 3A that is sufficient to maintain the powder at or slightly above its melting point;

FIG. 3C is a graphical illustration of the amount of heat introduced in an alternative embodiment of the practice of the invention by four successive laser scans, the first of which is at somewhat higher energy designed to bring a fusible the powder up to melting and the subsequent three of which are at a reduced energy sufficient to maintain the powder at or slightly above its melting point; and FIG. 4 is a graphical illustration of the relationship between density of the built part made in accordance with the invention and the time for which the built part is maintained at an elevated temperature at or near its melting point; and FIG. 5 illustrates the percent elongation for examples scanned at varying laser intensities.

DETAILED DESCRIPTION OF THE INVENTION

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A conventional selective laser sintering system having a dual feed for fusible powder of the type currently sold by 3D Systems, Inc. of Valencia, Calif. is illustrated in FIGS. 1 and 2. Conventional sintering systems typically include a directed energy beam and a controller for aiming the energy beam. As shown in the Figures, the directed energy beam is a carbon dioxide laser 108. Its scanning system 114 is depicted mounted in unit 100 above a process chamber 102 that includes a part bed or part cake 132 in which the powder is fused to build a part. The process chamber maintains the appropriate temperature and atmospheric composition for the fabrication of the part. The atmosphere is typically an inert atmosphere, such as nitrogen. It is also possible to operate the process chamber under vacuum.

The part cake includes regions of fused and unfused powder and contains the part that is being built. The region of fused powder is the built part 131. The region of unfused powder is designated as 106 in FIG. 2. The system as illustrated is a dual feed system that includes two powder cartridges 124, 126 which alternately supply fresh layers of powder to the part bed from opposite directions. A leveling device, which may be a counter-rotating roller 130, or a knife including a doctor blade or similar apparatus, distributes the fresh powder over the powder bed. Typically, a first portion of the powder is deposited within the target area followed by scanning the powder with the laser beam, and repeating with a second portion of powder and scanning. These steps are repeated as necessary, layer-by-layer, to produce the desired object.

Laser 108 generates a laser beam 104 that scanning system 114 aims at a target surface 110 in part cake 132. Scanning system 114 includes galvanometer-driven mirrors that deflect the laser beam. The laser and galvanometer systems are isolated from the hot process chamber 102 by a laser window 116, as seen in FIG. 2. The deflection and focal length of the laser beam is controlled, in combination with the modulation of laser 108, to direct a preselected laser energy to those locations of the fusible powder layer corresponding to the cross-section of the article to be formed in that layer, which is target surface 110. Scanning system 114 scans the laser beam across the powder in a vector fashion with the laser beam intersecting the powder surface in the target area 110. It should be recognized that a scanning system capable of a raster scan could also be used.

The scanning system typically includes a controller (not shown) that may be operatively connected to the directed energy beam and the galvanometers. The controller controls the position and direction of the energy beam through the galvanometers and modulates the energy level of the beam. Typically, the controller comprises a computer or equivalent device that can be used to control the operation of the system. The computer may include a CAD/CAM system, as where the computer is given the overall dimensions and configuration of the part to be made and the computer determines the boundaries of each cross-sectional region of the part. Using the preselected nominal boundaries, the computer controls fusing of each layer corresponding to the cross-sectional slices taken through the part. In an alternative embodiment, the computer is simply programmed with the boundaries of each cross-sectional region of the part.

As shown in FIG. 2, two powder cartridges 124, 126 feed powder into the process chamber by means of push-up pistons 125, 127, respectively. Piston 127 first pushes up a measured amount of powder 123 from powder feed cartridge 126 and a counter-rotating roller 130 pushes and spreads the powder over the part cake 132 in a uniform manner. The counter-rotating roller 130 passes completely over part cake 132, including the target area 110, and powder cartridge 124 to produce a level layer of powder extending from one side of the process chamber to the other. Residual powder, if any, is deposited into an overflow receptacle 136. The system then directs the laser beam to fuse powder in the target area. In an analogous manner, powder cartridge 124 supplies the next layer of powder to the roller via piston 125, which is spread over the powder bed and powder cartridge 126 with excess deposited into overflow receptacle 138. The dual feed system operates in this manner until all the layers are deposited and fused and the part is built. Piston 128 lowers the part cake after each layer is fused so as to accommodate the next layer of fresh powder.

Another powder delivery system uses overhead hoppers to feed powder from above and either side of target area 110 in front of a delivery apparatus such as a wiper or scraper. It should be recognized that the invention can be used with a wide variety of different systems and is not limited to any particular laser sintering system or design.

Positioned near the top of the process chamber 102 above each powder chamber and above the part bed 132 are radiant heater elements. Heater elements 122 pre-heat the feed powder and maintain the feed powder in a heated condition for deposit on the powder bed and to minimize thermal shock. Heater element 120 heats the part cake and desirably maintains the target area at a temperature just below melting. Laser window 116 is situated above and on an axis that positions it within radiant heater elements 120, which define a central opening for the laser window. These heater elements 120 may be ring shaped panels or radiant heater rods that surround the laser window 116. The rings may be rectangular or circular.

A wide variety of fusible media may be used in the practice of the invention. Suitable powders include amorphous, crystalline, and semi-crystalline powders, although not necessarily with equivalent results. Semi-crystalline powders melt and recrystallize well in the practice of the invention whereas crystalline powders can exhibit brittleness and amorphous powders can tend to produce built parts exhibiting growth. Growth in amorphous parts is in distinction to amorphous parts produced by injection molding where the polymer melt is confined by the mold surfaces. Crystalline powders tend to have melting points that equal or are very close to the temperature of recrystallization, which is not desirable in the practice of laser sintering. Semi-crystalline powders having a melting point well distinct from their recrystallization point work well in the practice of the invention.

Suitable powders include semi-crystalline polymers, such as, nylons, polystyrenes, polybutylene terephthalate (PBT), ethylenes, propylenes, and polyacetals (PA), and copolymers and homopolymers thereof. A particularly useful fusable media is nylon-12 which is available from 3D Systems, Inc. under the trademark DuraForm®.

In accordance with the invention, exposing each powder layer to a plurality of laser scans at various preselected energies improves the mechanical properties and dimensional accuracy of the resulting part. Scanning each layer at an energy level to maintain the powder at or slightly above its melting point helps to control the amount of heat that is applied to the powder so that the amount of melting that each particle undergoes can be limited. As a result, the decrease in viscosity of the powder can be controlled and growth can be reduced or substantially eliminated.

Previously scanning at low energies was considered somewhat undesirable because of the resultant decrease in viscosity of the targeted particles that results could be sufficient to reduce or preclude the particles and successive layers from effectively fusing. As a result, the mechanical stability of the part could be adversely impacted. In sharp contrast, however, it has now been determined that exposing the powder layer to multiple laser scans at preselected energies designed to maintain the fusible material at or just above its melting point results in the molten material flowing together in discreet incremental steps that improves fusion, strength, and density of the parts while preserving precise dimensions and in the absence of unwanted growth. Multiple and successively different energy levels can be delivered by the laser 108 either via software or by overlaying .STL files, each having a different laser energy level setting.

Typically, the first scan of the layer is fully completed before the second scan begins and sufficient dwell time is provided to allow the heated layer to flow and cool slightly so as to dissipate heat to the part cake, but still maintain the fused area as a liquid. It should be recognized that dual beam lasers can also be used in the practice of the invention in which there is no cooling time between scans, so long as over-melting and consequent growth do not occur. It should also be recognized that, depending upon the energy of the laser or the size of the area scanned, each raster or vector scan can be rescanned immediately, although not necessarily with equivalent results. If desired, the laser beam diameter and spacing can be varied between subsequent scans.

FIGS. 3A, 3B, and 3C illustrate a comparison of the conventional scanning method (FIG. 3A) to that of the invention (FIGS. 3B and 3C). As shown in FIG. 3A, a conventional scanning method typically includes scanning the powder with the laser at a high energy level in a single scan. In an attempt to improve the density of the part, the powder is typically heated with the laser to a temperature that is significantly higher than the melting point of the powder. This higher energy laser scan may cause a larger percentage of the powder particles to have a low viscosity and remain in a low viscosity state for an extended period of time. As a result, the part may experience undesirable distortion from the desired dimensions.

In contrast, FIG. 3B illustrates that scanning with three successive equal scans at low energies that are separated in time results in the powder being heated slightly above its melting point. The amount of energy directed at the powder should be high enough to allow the viscous material to flow in a controlled manner and cool before any undesirable distortion of the part can occur.

FIG. 3C shows an initial laser pulse heating and melting the fusible powder with subsequent pulses of reduced power to continue to heat the already melted material to maintain the material at or slightly above the melting point.

According to one aspect of the invention, the method provides a means whereby distortion of the part may be reduced. Typically, the resulting dimensional accuracy of the final part should have minimal growth in comparison to the nominal value for the part. The term "nominal value" refers to the expected value for the part that is input or calculated by the CAD/CAM software. Typically, the closer the mean dimensional value is to the nominal value, the more dimensionally accurate is the resulting part.

In another aspect of the invention, scanning the powder with multiple laser scans also allows the density of the part to be increased up to a maximum limit. While not a precise correlation, it is generally true that an increase in density reflects an increase in strength, so long as the dimensions are acceptable. Typically, increasing the density will improve the part's mechanical stability including its tensile strength, percent yield at break, and tensile modulus. It has been found that even small changes in the part's density can significantly affect the resulting mechanical stability of the part.

Preferably, the density of the resulting part is close or equivalent to the ultimate density that is possible for the material from which the part is composed. The term "ultimate density" corresponds in meaning to describing a part as fully dense, which is that density of a mass of the material melted in a vacuum. Injection molded parts are typically fully dense or nearly fully dense. Ultimate density can be defined as characterizing a part that has no void spaces in its volume, no measurable porosity. The method of the invention can produce parts having densities that closely approach ultimate density. The relationship between ultimate density and the length of time at which a fusible powder target area is maintained at or slightly above its melting point, in the absence of growth, is illustrated in FIG. 4.

While not wishing to be bound by theory, it is believed that increasing the number of laser scans and reducing the energy of the laser helps to keep the molten fusible material closer to its melting point while providing sufficient time and sufficient lowering of the molten material's viscosity so that fusion of the molten material may occur at ultimate density. Each scan softens and melts the outer boundaries of the particles so that the viscous material flows into the void spaces between the particles in discrete incremental steps. As a result, with each successive scan the density of the part can be increased up to a maximum or desired limit while substantially eliminating any distortion of the part.

It should be recognized that the number of scans necessary to increase the density is dependent upon many factors including, for example, the powder's physical properties such as its melting point and viscosity, laser power utilized in the scan, time between scans, time constraints for producing the part, and the like.

In another aspect of the invention, the intensity of each successive scan can be varied to decrease the amount of time that is needed to produce a part having a desired dimensional accuracy and density. For instance, the initial scan may have the highest intensity than the subsequent scans or it may have the highest intensity with each successive scan having a lower intensity. The first scan should allow a greater portion of each scanned particle to reach a higher temperature resulting in a longer cooling period. As a result, the molten material will have a longer period of time in which to flow and fuse together. The heat to which the powder is exposed should be low enough so that growth does not occur. In each subsequent scan the energy can be reduced to facilitate incremental controlled fusing of the particles. This process should be more efficient because it combines higher laser energies in the initial scan with lower energies in subsequent scans to incrementally produce the part at a faster rate of speed.

During the laser sintering process, the part bed 132 in the powder bed is heated to an equilibrium state that is below its melting point. When the laser beam is applied to the powder in the target area, a localized hot zone is created. The temperature rise of the fused powder can be calculated using its measured heat capacity, heat of fusion and density. The sintering behavior of this powder can be modeled using the sintering law described by Childs et. al. in the 2001 edition of the Rapid Prototyping Journal at pages 180 through 184 of Volume 7, in an article entitled "Density Prediction of Crystalline Polymer Sintered Parts at Various Part cake Temperatures." In the sintering law, the increase in density with time is related to the sintering progress and is shown to be a function of both density and temperature:

$$d\rho/dt = f(\rho, T)$$

As can be seen from the mathematical relationship, the viscosity decreases and the density generally increases due to void reduction when the temperature of the material rises. At a constant temperature, sintering progresses with time, however, the sintering rate decreases as the density approaches the maximum material density.

It is advantageous to raise the powder temperature as hot as possible to achieve low viscosity. It is also advantageous to maintain the fused powder at a high temperature for as long as possible to allow densification to proceed. However, thermal energy added to the fused or partially fused powder can cause melting of particles adjacent to the part, which results in undesirable growth.

Theoretically then, the ideal sintering case can be modeled as one where it is desired to add as much heat to the fused part as possible, yet maintain a heat flux out of the part into the adjacent powder so that this adjacent powder cannot melt and fuse. This heat flux will, in general, be limited by the thermal conductivity of the powder. In other words, adding more power to the part than the powder can thermally remove will cause melting of the adjacent particles. Adding power at a rate less than this theoretical limit will prevent heat buildup and limit powder melting. In the absence of some other active cooling mechanism, this practically limits the amount of power that can be added to the part per unit time.

The multiple scanning techniques of the invention improve the sintering/densification rate of powder by keeping the part temperature high, but not so high as to result growth, while simultaneously providing time for sintering via viscous flow within the target area.

EXAMPLES

The following Examples are for illustrative purposes only and should not be considered limiting in any way.

In the following examples, the samples were prepared by sintering a layer of DuraForm® nylon powder with from 1 to 3 scans at varying laser intensities. A 100 watt high speed Vanguard™ V207 laser sintering system available from 3D Systems, Inc. was used to form the samples.

For convenience, the examples in FIG. 5, which may be considered Table 1, illustrate multiple scans of equal low power.

In some cases, the examples show relative tensile elongation improvements of 100% or better compared to a conventional single scan technique (column for 1 scan in FIG. 5) and improvements of approximately 30% in elongation compared to elongations of approximately 10% for the conventional technique.

It should be recognized that multiple scans at too high a power will result in growth, as shown in FIG. 5 for the example of 10 scans at 7 watts.

Multiple scanning is desirably accomplished at varying laser powers. It is sometimes preferable to use a relatively high laser pulse on the first scan compared to subsequent scans since the freshly deposited powder is relatively cold compared to previously melted material in the same layer. Successive subsequent scans can have successively lower energy levels. In this way, additional heat can be added to the powder to quickly raise its internal energy close to the temperature at which the sintering rate becomes significant. Subsequent scans are then used to maintain the fused powder mass at this higher temperature. The use of a higher power initial laser scan normally should result in faster part production while maintaining the heat flow needed to minimize growth. However, it remains important not to use too high a power on the first scan of the first layer of a part because excessive laser power will bleed through the layer and cause growth on the powder below the desired plane of the part. Subsequent layers should not suffer from this problem since they already have fused material beneath them.

Strength improvements of 100% or better are shown by using multiple full power scans separated by delay times that allow for excess thermal energy to dissipate. In this example, shown in Table 2 below, the target area is scanned three times by the laser, followed by long multiple delays of sacrificial parts that serve to act as a time delay mechanism. The desired parts are then rescanned again within the same layer, again followed by the delay parts.

TABLE 2

| Layer | Time to scan tensile bars | Time to scan beam coupon | Time to scan sacrificial parts (delay time) |
|---|---|---|---|
| 1 (bottom) | 22 | 5 | 3 parts * 10 scans = 90 sec |
| 2 | 22 | 5 | 1.66 parts * 10 scans = 45 sec |
| 3 (top) | 22 | 5 | 1 parts * 10 scans = 30 sec |

| Layer | Tensile | % E | Modulus |
|---|---|---|---|
| 1 (bottom) | 7100 | 15 | 250 |
| 2 | 7100 | 21 | 240 |
| 3 (top) | 6800 | 19 | 230 |
| DFPA standard | 4800 | 8 | 210 |

While not wishing to be bound by theory, the heat transfer out of the freshly fused powder is considered to be a function of its local environment, whether the freshly fused powder sits in a block of fused powder or exists as a thin line of fused powder in a cake of unfused powder. This local environment affects the heat flow by allowing or restricting access to the part cake. In the case of a fused block, the interior of the block transfers heat across the volume of the part to the part cake. This pathway may be long and complex, reducing the heat transfer rate and increasing the possibility of unwanted growth. On the other hand, a thin line of fused powder has a large amount of surface area in proximity to the part bed and heat transfer can occur quite easily.

Tables 3 through 6 below illustrate additional examples of multiple scanning techniques of the invention and the impact of laser power, the number of scans, and the delay time between scans on the quality of the parts produced. In these examples, a delay or dwell time occurred in those examples having multiple scans between the end of one scan and the beginning of another. The dwell time allows the powder to cool and heat to dissipate, but generally the dwell time was not so long that the powder cooled much below its melting point.

Table 4 shows the weights obtained for the examples of Table 3 and Table 6 shows the weights obtained for the examples of Table 5. Example 4 in Table 3 shows that too high a laser power with inadequate delay between scans resulted in unwanted part growth. Comparing Examples 8, 9 and 2 to 1 and 7, respectively, it is seen that while the conventional single scan (Examples 1 and 7) and the multiple scan technique of the invention (Examples 8, 9, and 2) each resulted in parts with acceptable or at least not significant growth, the multiple scan technique of the invention resulted in significant increases in weight, which generally correlates with density and improved mechanical properties. Those examples showing increased weight and not having acceptable growth do not accurately reflect density since the shape is typically irregular. Improvements in mechanical properties are borne out in the data obtained for tensile strength, % elongation, and tensile modulus for those examples showing multiple scans and acceptable growth. The poor quality of Examples 3 thorough 6 is attributed to use of too high a laser power for too many scans with inadequate heat dissipation between scans.

Comparing Examples 1, 4, and 7 of the conventional single scan technique to Examples 3 and 8 of Tables 5 and 6 shows improvements in density and mechanical properties by the practice of the invention. Examples 2, 5, 6, and 9 are consistent with Tables 3 and 4 in that multiple scans at too intense a laser power can result in unwanted growth.

TABLE 3

| Run No. | Quality* | MLT** | Number of Scans | Laser Power in Watts | Width (in) | Tensile Strength (psi)± | % Elongation at break± | Tensile Modulus (kpsi)± | Thickness (in) |
|---|---|---|---|---|---|---|---|---|---|
| 1 | 5 | 15 | 1 | 50 | 0.514 | 3776 | 5.2 | 194 | 0.124 |
| 2 | 4 | 15 | 2 | 60 | 0.529 | 6088 | 6.9 | 273 | 0.132 |
| 3 | 0 | 15 | 3 | 70 | 0.587 | 5022 | 7.4 | 235 | 0.199 |
| 4 | 0 | 30 | 3 | 60 | 0.542 | 5279 | 7.8 | 256 | 0.178 |
| 5 | 0 | 30 | 2 | 70 | 0.528 | 6057 | 6.9 | 281 | 0.141 |
| 6 | 0 | 30 | 3 | 50 | 0.533 | 6091 | 8.8 | 283 | 0.145 |
| 7 | 5 | 60 | 1 | 70 | 0.517 | 5438 | 4.9 | 262 | 0.129 |
| 8 | 5 | 60 | 2 | 50 | 0.517 | 6397 | 7.9 | 278 | 0.126 |
| 9 | 4 | 60 | 3 | 60 | 0.534 | 6642 | 8.4 | 280 | 0.131 |

*Quality is a subjective determination based on the appearance of growth in the part, valued from 0 to 5, 5 indicating the absence of undesirable growth.
**MLT designates "minimum laser time" and refers to the number of seconds between the start of one laser scan and the next, including any dwell in time in between.
±Values determined according to the standard set forth in ASTM D-638.

TABLE 4

| Part Weights in Grams | | | | | | | | |
|---|---|---|---|---|---|---|---|---|
| Run 1 | Run 2 | Run 3 | Run 4 | Run 5 | Run 6 | Run 7 | Run 8 | Run 9 |
| 7.4 | 9.4 | 15.0 | 12.5 | 9.9 | 10.6 | 8.4 | 8.7 | 10.2 |
| 7.5 | 9.2 | 14.1 | 12.4 | 10.2 | 10.6 | 8.4 | 8.9 | 10.3 |
| 7.5 | 9.3 | 14.7 | 11.7 | 9.9 | 10.6 | 8.4 | 8.8 | 10.1 |
| 7.7 | 9.4 | 14.9 | 12.3 | 9.8 | 10.3 | 8.4 | 8.8 | 10.1 |
| 7.5 | 9.3 | 14.7 | 12.1 | 10.0 | 10.3 | 8.4 | 8.8 | 10.2 |

TABLE 5

| Run No. | Quality* | MLT** | Number of Scans | Laser Power in Watts | Width (in) | Tensile Strength (psi)± | % Elongation at break± | Tensile Modulus (kpsi)± | Thickness (in) |
|---|---|---|---|---|---|---|---|---|---|
| 1 | +5 | 30 | 1 | 14 | 0.508 | 6004 | 4.1 | 280 | 0.122 |
| 2 | +1 | 30 | 2 | 19 | 0.523 | 6300 | 5.6 | 285 | 0.145 |
| 3 | −5 | 30 | 3 | 25 | 0.590 | 5695 | 6.0 | 286 | 0.200 |
| 4 | +5 | 60 | 1 | 19 | 0.511 | 6530 | 4.7 | 301 | 0.128 |
| 5 | 0 | 60 | 2 | 25 | 0.540 | 5540 | 5.3 | 261 | 0.173 |
| 6 | 0 | 60 | 3 | 14 | 0.523 | 6338 | 7.3 | 285 | 0.152 |
| 7 | +5 | 90 | 1 | 25 | 0.513 | 6387 | 5.8 | 298 | 0.126 |
| 8 | +5 | 90 | 2 | 14 | 0.512 | 6762 | 8.0 | 293 | 0.134 |
| 9 | 0 | 90 | 3 | 19 | 0.544 | 5560 | 10.0 | 227 | 0.176 |

*Quality is a subjective determination based on the appearance of growth in the part, valued from 0 to 5, 5 indicating the absence of undesirable growth.
**MLT designates "minimum laser time" and refers to the number of seconds between the start of one laser scan and the next, including any dwell in time in between.
±Values determined according to the standard set forth in ASTM D-638.

TABLE 6

Part Weights in Grams

| Run 1 | Run 2 | Run 3 | Run 4 | Run 5 | Run 6 | Run 7 | Run 8 | Run 9 |
|---|---|---|---|---|---|---|---|---|
| 8.1 | 9.9 | 15.2 | 8.5 | 11.7 | 10.3 | 8.4 | 9.1 | 11.8 |
| 7.9 | 9.6 | 15.2 | 8.4 | 11.3 | 10.0 | 8.4 | 9.1 | 11.4 |
| 8.3 | 9.6 | 14.9 | 8.5 | 11.2 | 9.8 | 8.5 | 8.9 | 11.3 |
| 8.0 | 9.8 | 15.6 | 8.4 | 11.6 | 10.1 | 8.6 | 8.9 | 11.6 |
| 7.9 | 10.3 | 15.7 | 8.4 | 12.0 | 10.3 | 8.5 | 8.9 | 11.8 |

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. All patents and patent applications referenced herein are hereby specifically incorporated by reference in pertinent part.

What is claimed is:

1. A method of laser sintering comprising the steps of:
   a. providing a layer of fusible powder;
   b. exposing a predetermined target area of the powder within the layer to a plurality of scans of laser energy at a controlled energy level and along the same fusion path for a time to maintain the powder in said target area at or above its melting point in the absence of fusing adjacent powder in the layer outside the target area; and
   c. repeating the steps of providing and exposing a plurality of times to produce a three dimensional object, the plurality of scans being characterized by an initial scan having an energy level that is higher than subsequent scans.

2. The method according to claim 1, wherein the step of exposing the target area to a plurality of scans comprises two or more scans.

3. The method according to claim 1, wherein within the step of repeating the steps of providing and exposing, the target area varies among repetitions.

4. A method according to claim 1, wherein the step of providing a layer of fusible powder comprises depositing a layer of powder of predetermined thickness onto a part cake surface wherein said powder is selected from group consisting of nylon-11, nylon-12, polystyrene, polybutylene terephthalate, and polyacetal.

5. A method according to claim 1, wherein the step of exposing the fusible powder to a plurality of scans produces a fused mass of predetermined geometry.

6. A method according to claim 1, wherein the step of exposing the fusible powder to a plurality of scans comprises exposing the powder to subsequent scans each having successively lower energy levels.

7. A method according to claim 1, wherein the step of exposing the target area of fusible powder to a plurality of scans comprises:
   scanning said target area of fusible powder a first time with laser energy to melt said powder;
   allowing heat to dissipate to powder beyond said target area while maintaining the target area in a melted state; and
   rescanning said layer of powder a second time with laser energy sufficient and for a time sufficient to maintain the target area in a melted condition.

8. A method according to claim 7, wherein the first scan has an energy level that is higher than energy level of any subsequent scan.

9. A method according to claim 1, wherein the step of exposing the fusible powder to a plurality of scans of laser energy further comprises supplying a $CO_2$ laser.

10. A method according to claim 1, wherein the step of exposing said fusible powder to a plurality of scans of laser energy further comprises scanning the layer in vector fashion.

11. A method of producing a part comprising the steps of:
   depositing a layer of fusible powder onto and adjacent to a preselected target area;
   scanning a directed energy beam over the target area in an initial scan to melt the powder in the target area;
   allowing heat to dissipate into adjacent powder while maintaining the target area powder melted and in the absence of fusing adjacent powder;
   rescanning the target area at least one time along the same fusion path at a lower energy level than the initial scan to maintain the target area powder in a melted state and in the absence of fusing adjacent powder;
   repeating the above steps to form a three dimensional part.

12. The method according to claim 11, comprising the further steps of:
   providing a controller operatively connected to the directed energy beam; and supplying the controller with the boundaries of each cross-sectional region of the part.

13. The method according to claim 12, comprising the further steps of:
provided a computer; and
supplying the overall dimensions of the part to the computer, the computer determining the boundaries of each cross-sectional region of the part.

14. The method according to claim 12, wherein the scanning steps include the steps of moving the aim of the beam in a raster scan.

15. The method according to claim 11, wherein the rescanning step includes exposing the target area powder to subsequent scans each having successively lower energy levels.

* * * * *